(12) United States Patent
Araujo Da Silva et al.

(10) Patent No.: US 9,340,626 B2
(45) Date of Patent: May 17, 2016

(54) TIRE AND RUBBER COMPOSITION CONTAINING A GRAFTED POLYMER

(75) Inventors: José Carlos Araujo Da Silva, Pont du Chateau (FR); Jean-Michel Favrot, Cournon-d'Auvergne (FR); Rachid Matmour, Clermont-Ferrand (FR); Anne Frédérique Salit, Clermont-Ferrand (FR); Nicolas Seeboth, Clermont-Ferrand (FR)

(73) Assignees: COMPAGNIE GENERALE DES ETABLISSEMENTS MICHELIN, Clermont-Ferrand (FR); MICHELIN RECHERCHE ET TECHNIQUE S.A., Granges-Paccot (CH)

( * ) Notice: Subject to any disclaimer, the term of this patent is extended or adjusted under 35 U.S.C. 154(b) by 746 days.

(21) Appl. No.: 13/581,595

(22) PCT Filed: Mar. 15, 2011

(86) PCT No.: PCT/EP2011/053861
§ 371 (c)(1),
(2), (4) Date: Sep. 24, 2012

(87) PCT Pub. No.: WO2011/113818
PCT Pub. Date: Sep. 22, 2011

(65) Prior Publication Data
US 2013/0012652 A1    Jan. 10, 2013

(30) Foreign Application Priority Data
Mar. 18, 2010   (FR) ...................................... 10 51959

(51) Int. Cl.
| | | |
|---|---|---|
| B60C 1/00 | (2006.01) | |
| C08C 19/20 | (2006.01) | |
| C08C 19/22 | (2006.01) | |
| C08C 19/25 | (2006.01) | |
| C08L 15/00 | (2006.01) | |

(52) U.S. Cl.
CPC ................. C08C 19/20 (2013.01); C08C 19/22 (2013.01); C08C 19/25 (2013.01); C08L 15/00 (2013.01)

(58) Field of Classification Search
CPC ........ C08C 19/20; C08C 19/22; C08C 19/25; B60C 1/00
See application file for complete search history.

(56) References Cited

U.S. PATENT DOCUMENTS

| | | | |
|---|---|---|---|
| 5,188,745 A | 2/1993 | Migdal et al. | |
| 5,977,238 A | 11/1999 | Labauze | |
| 6,013,718 A | 1/2000 | Cabioch et al. | |
| 6,503,973 B2 | 1/2003 | Robert et al. | |
| 6,774,255 B1 | 8/2004 | Tardivat et al. | |
| 6,815,473 B2 | 11/2004 | Robert et al. | |
| 2003/0212185 A1 | 11/2003 | Vasseur | |
| 2004/0051210 A1 | 3/2004 | Tardivat et al. | |
| 2004/0167705 A1 | 8/2004 | Lingman et al. | |
| 2005/0016650 A1 | 1/2005 | Durel et al. | |
| 2005/0016651 A1 | 1/2005 | Durel et al. | |
| 2005/0239639 A1 | 10/2005 | Monteil et al. | |
| 2006/0089445 A1 | 4/2006 | Gandon-Pain | |
| 2008/0132644 A1 | 6/2008 | Lapra et al. | |
| 2008/0221272 A1 | 9/2008 | Tournilhac et al. | |
| 2009/0186961 A1 | 7/2009 | Araujo Da Silva et al. | |
| 2009/0209709 A1 | 8/2009 | Araujo Da Silva et al. | |
| 2009/0234066 A1 | 9/2009 | Araujo Da Silva et al. | |
| 2009/0270558 A1 | 10/2009 | Gandon-Pain et al. | |
| 2010/0184912 A1 | 7/2010 | Marechal et al. | |
| 2010/0249270 A1 | 9/2010 | Robert et al. | |
| 2010/0252156 A1 | 10/2010 | Robert et al. | |
| 2011/0009547 A1 | 1/2011 | Araujo Da Silva et al. | |
| 2011/0178233 A1 | 7/2011 | Chaboche et al. | |
| 2012/0220725 A1* | 8/2012 | Hidalgo | .................. C08L 21/00 525/186 |

FOREIGN PATENT DOCUMENTS

| | | |
|---|---|---|
| EP | 1 127 909 A1 | 8/2001 |
| FR | 2 740 778 A1 | 5/1997 |
| FR | 2 765 882 A1 | 1/1999 |

(Continued)

OTHER PUBLICATIONS

International Search Report (PCT/ISA/210) issued on May 5, 2011, by the European Patent Office as the International Searching Authority for International Application No. PCT/EP2011/053861.
F. Vilmin et al., "Fast and Robust Method for the Determination of Microstructure and Composition in Butadiene, Styrene-Butadiene, and Isoprene Rubber by Near-Infrared Spectroscopy", Applied Spectroscopy, 2006 (month unknown), pp. 619-630, vol. 60, No. 6.

*Primary Examiner* — Peter D Mulcahy
(74) *Attorney, Agent, or Firm* — Dickinson Wright PLLC

(57) ABSTRACT

The invention relates to a tire comprising at least one rubber composition based on at least one diene elastomer, one reinforcing filler, one chemical crosslinking agent and one modifying agent, chosen from the compounds of following formula (I):

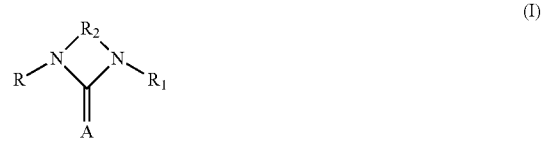

where
R denotes a unit comprising at least one reactive group,
$R_1$ denotes hydrogen,
$R_2$ denotes an alkylene radical comprising from 2 to 8 carbon atoms and optionally one or more heteroatoms chosen from S, N, O or Si,
A denotes an oxygen or sulphur atom or an =NH group, preferably an oxygen atom.

24 Claims, No Drawings

(56) References Cited

FOREIGN PATENT DOCUMENTS

| | | |
|---|---|---|
| WO | WO 97/36724 A2 | 10/1997 |
| WO | WO 99/16600 A1 | 4/1999 |
| WO | WO 01/92402 A1 | 12/2001 |
| WO | WO 02/10269 A2 | 2/2002 |
| WO | WO 02/30939 A1 | 4/2002 |
| WO | WO 02/31041 A1 | 4/2002 |
| WO | WO 03/002648 A1 | 1/2003 |
| WO | WO 03/002649 A1 | 1/2003 |
| WO | WO 03/016837 A1 | 2/2003 |
| WO | WO 2004/035639 A1 | 4/2004 |
| WO | WO 2004/096865 A2 | 11/2004 |
| WO | WO 2006/016041 A1 | 2/2006 |
| WO | WO 2006/069792 A1 | 7/2006 |
| WO | WO 2006/069793 A1 | 7/2006 |
| WO | WO 2006/125532 A1 | 11/2006 |
| WO | WO 2006/125534 A1 | 11/2006 |
| WO | WO 2006/152233 A1 | 11/2006 |
| WO | WO 2008/141702 A1 | 11/2008 |
| WO | WO 2009/000750 A1 | 12/2008 |
| WO | WO 2009/000752 A1 | 12/2008 |
| WO | WO 2009/062733 A2 | 5/2009 |
| WO | WO 2009/133068 A1 | 11/2009 |

* cited by examiner

TIRE AND RUBBER COMPOSITION CONTAINING A GRAFTED POLYMER

The present invention relates to a tire comprising a rubber composition based on at least one diene elastomer, on a reinforcing filler, on a chemical crosslinking agent and on at least one specific modifying agent.

In the field of the manufacture of tires and in particular on the formulation of rubber compositions in contact with the ground, known as treads, the aim is generally to find the best possible compromise between conflicting performances, such as the rolling resistance and the ability of the tire to temporarily accept certain strains.

In particular, it is desirable for the materials forming the treads to exhibit good stiffness at low and moderate strains, so as in particular to provide a low rolling resistance, while being capable of reversibly accepting certain strains and without being damaged under the effect of greater stresses or strains. In other words, it is desirable to have available a material which, while being stiff at low and moderate strains, exhibits a high elongation at break or a high breaking stress.

It is well known that the chemical crosslinking of elastomers confers good mechanical and thermal properties thereon. Chemical crosslinking is characterized by the establishment of covalent chemical bonds between the polymer chains. Numerous methods for chemical crosslinking exist. The most widely used methods are those based on sulphur compounds, of use in the crosslinking of elastomeric materials comprising unsaturations in their main chains. Another widely used method is chemical crosslinking with peroxides.

However, when the number of covalent bonds between the polymer chains (bridge density) increases, the stiffness at the low and moderate strains increases but the elongation at break decreases. Conversely, if the bridge density decreases, the elongation at break increases but the stiffness at low and moderate strains decreases.

The Applicant Company has discovered that the compromise between a good stiffness at low and moderate strain and a high elongation at break can be obtained by introducing, into the elastomer, a specific density of the noncovalent bonds between the chains.

The presence of noncovalent bonds between the chains is generally known as physical crosslinking or reversible crosslinking. Physical crosslinking can be obtained by functionalising the chain of the polymer with chemical molecules capable of associating with one another via nonpermanent physical interactions, such as ionic interactions, hydrogen bonds, ion-dipole interactions and dipole-dipole interactions.

When such an elastomer is formulated in a rubber composition in the presence of a chemical crosslinking system, covalent bonds appear between the elastomer chains, which will be additional to the noncovalent bonds.

In the continuation of the text, "content of modifying agent" present in a rubber composition is understood to mean, expressed as molar percentage, the number of molecules of modifying agent present in the composition per hundred diene elastomer units of the composition, whether they are, without distinction, diene or nondiene units.

For example, if the content of modifying agent with regard to an SBR is 0.20 mol %, this means that there will be 0.20 molecule of modifying agent per 100 styrene and butadiene units of the SBR.

In the case where use is made in the composition both of an elastomer pregrafted with the modifying agent and a diene elastomer not grafted with a modifying agent, the content of modifying agent represents the number of molecules of modifying agent grafted per 100 units of diene elastomers, the number of units taking into account both elastomers (grafted and ungrafted), it being assumed that other molecules of modifying agent not pregrafted have not been added to the composition.

A subject-matter of the invention is thus a tire comprising at least one rubber composition based on at least one diene elastomer, one reinforcing filler, one chemical crosslinking agent and one modifying agent, optionally pregrafted to the diene elastomer, chosen from the compounds of following formula (I):

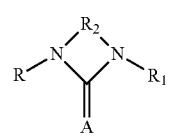

where

R denotes a unit comprising at least one reactive group, $R_1$ denotes hydrogen, $R_2$ denotes an alkylene radical comprising from 2 to 8 carbon atoms and optionally one or more heteroatoms chosen from S, N, O or Si, A denotes an oxygen or sulphur atom or an =NH group, preferably an oxygen atom.

The crosslinking bridges comprising covalent bonds are formed by virtue of the presence of the chemical crosslinking system. The crosslinking bridges comprising noncovalent bonds are formed by the presence of the associative groups of the modifying agent once grafted along the chain of the elastomer.

Another subject-matter of the invention is a process for preparing a tire rubber composition based on at least one diene elastomer, one reinforcing filler and one chemical crosslinking agent, characterized in that it comprises the following stages:

grafting, to the diene elastomer, a modifying agent chosen from the compounds of following formula (I):

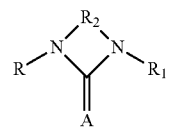

where

R denotes a unit comprising at least one reactive group, $R_1$ denotes hydrogen, $R_2$ denotes an alkylene radical comprising from 2 to 8 carbon atoms and optionally one or more heteroatoms chosen from S, N, O or Si, A denotes an oxygen or sulphur atom or an =NH group, preferably an oxygen atom, incorporating, in the diene elastomer thus grafted by the modifying agent, the reinforcing filler, everything being thermomechanically kneaded, in one or more goes, until a maximum temperature of between 130° C. and 200° C. is reached, cooling the combined mixture to a temperature of less than 100° C., subsequently incorporating the chemical crosslinking agent, kneading everything up to a maximum temperature of less than 120° C., extruding or calendaring the rubber composition thus obtained.

A further subject-matter of the invention is a process for preparing a tire rubber composition based on at least one diene elastomer, one reinforcing filler and one chemical crosslinking agent, characterized in that it comprises the following stages:

incorporating, in the diene elastomer, the reinforcing filler and a modifying agent chosen from the compounds of following formula (I):

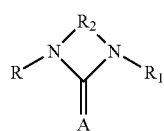

(I)

where

R denotes a unit comprising at least one reactive group, $R_1$ denotes hydrogen, $R_2$ denotes an alkylene radical comprising from 2 to 8 carbon atoms and optionally one or more heteroatoms chosen from S, N, O or Si, A denotes an oxygen or sulphur atom or an =NH group, preferably an oxygen atom, everything being kneaded thermomechanically, in one or more goes, until a maximum temperature of between 130° C. and 200° C. is reached, cooling the combined mixture to a temperature of less than 100° C., subsequently incorporating the chemical crosslinking agent, kneading everything up to a maximum temperature of less than 120° C., extruding or calendaring the rubber composition thus obtained.

In particular, the rubber composition included in the tire according to the invention can be present in at least one semifinished product made of rubber for the tire, this semifinished product preferably being chosen from the group consisting of treads, crown reinforcing plies, sidewalls, carcass reinforcing plies, beads, protectors, rubber blocks and other internal rubbers, in particular decoupling rubbers, intended to provide the bonding or the interface between the abovementioned regions of the tires.

The tires in accordance with the invention are intended in particular for passenger vehicles, as for two-wheel vehicles (motorcycles, bicycles) or for industrial vehicles chosen from vans, heavy-duty vehicles, i.e. underground, bus, heavy road transport vehicles (lorries, tractors, trailers) or off-road vehicles, agricultural vehicles, earth moving equipment, aircraft, or other transportation or handling vehicles.

The invention and its advantages will be easily understood in the light of the description and implementational examples which follow.

I. MEASUREMENTS AND TESTS USED

The elastomers and rubber compositions are characterized, before and after curing, as indicated below.

Glass Transition Temperature

The glass transition temperatures Tg of the polymers are measured using a differential calorimeter ("differential scanning calorimeter"). The analysis is carried out according to the requirements of Standard ASTM D3418-08.

Near Infrared Spectroscopy (NIR)

Near infrared spectroscopy (NIR) is used to quantitatively determine the content by weight of styrene in the elastomer and its microstructure (relative distribution of the 1,2-vinyl, 1,4-trans- and 1,4-cis butadiene units). The principle of the method is based on the Beer-Lambert law generalised for a multicomponent system. As the method is indirect, it involves a multivariate calibration [Vilmin, F.; Dussap, C. and Coste, N., Applied Spectroscopy 2006, 60, 619-29] carried out using standard elastomers having a composition determined by $^{13}C$ NMR. The styrene content and the microstructure are then calculated from the NIR spectrum of an elastomer film having a thickness of approximately 730 µm. The spectrum is acquired in transmission mode between 4000 and 6200 $cm^{-1}$ with a resolution of 2 $cm^{-1}$ using a Bruker Tensor 37 Fourier-transform near infrared spectrometer equipped with an InGaAs detector cooled by the Peltier effect.

Size Exclusion Chromatography

Size exclusion chromatography or SEC is used. SEC makes it possible to separate macromolecules in solution according to their size through columns filled with a porous gel. The macromolecules are separated according to their hydrodynamic volume, the bulkiest being eluted first.

Without being an absolute method, SEC makes it possible to comprehend the distribution of the molar masses of a polymer. The various number-average molar masses (Mn) and weight-average molar masses (Mw) can be determined from commercial standards and the polydispersity index (Pi=Mw/Mn) can be calculated via a "Moore" calibration.

Preparation of the Polymer:

There is no specific treatment of the polymer sample before analysis. The latter is simply dissolved, in (tetrahydrofuran+1 vol % of diisopropylamine+1 vol % of triethylamine+1 vol % of distilled water) or in chloroform, at a concentration of approximately 1 g/l. The solution is then filtered through a filter with a porosity of 0.45 µm before injection.

SEC Analysis:

The apparatus used is a "Waters Alliance" chromatograph. The elution solvent is tetrahydrofuran+1 vol % of diisopropylamine+1 vol % of triethylamine or chloroform, depending on the solvent used for the dissolution of the polymer. The flow rate is 0.7 ml/min, the temperature of the system is 35° C. and the analytical time is 90 min. A set of four Waters columns in series, with commercial names "Styragel HMW7", "Styragel HMW6E" and two "Styragel HT6E", is used.

The volume of the solution of the polymer sample injected is 100 µl. The detector is a "Waters 2410" differential refractometer and the software for making use of the chromatographic data is the "Waters Empower" system.

The calculated average molar masses relate to a calibration curve produced from "PSS ReadyCal Kit" commercial polystyrene standards.

Tensile Test

These tensile tests make it possible to determine the elasticity stresses and the properties at break. Unless otherwise indicated, they are carried out in accordance with French Standard NF T 46-002 of September 1988. Processing the tensile recordings also makes it possible to plot the curve of modulus as a function of the elongation, the modulus used here being the nominal (or apparent) secant modulus measured in first elongation, calculated by reducing to the initial cross section of the test specimen. The nominal secant moduli (or apparent stresses, in MPa) are measured in first elongation at 10%, 100% and 300% elongation, respectively denoted MSA10, MSA100 and MSA300.

The breaking stresses (in MPa) and the elongations at break (in %) are measured at 23° C.±2° C. and at 100° C.±2° C., according to Standard NF T 46-002.

Dynamic Properties

The dynamic properties $\Delta E^*$ and $\tan(\delta)_{max}$ are measured on a viscosity analyser (Metravib VA4000) according to Standard ASTM D 5992-96. The response of a sample of vulcanised composition (cylindrical test specimen with a height of 20 mm and a cross section of 78 mm$^2$), subjected to an alternating sinusoidal stress in tension/compression, at a frequency of 10 Hz, under standard temperature conditions (23° C.) according to Standard ASTM D 1349-99 or, as the case may be, at a different temperature (100° C.), is recorded. A strain amplitude sweep is carried out from 0.01% to 7% (outward cycle) and then from 7% to 0.01% (return cycle). The results made use of are the complex dynamic modulus ($E^*$) and the loss factor $\tan(\delta)$. The maximum value of $\tan(\delta)$ observed, denoted $\tan(\delta)_{max}$, and the difference in complex modulus ($\Delta E^*$) between the values at 0.01% and at 7% strain (Payne effect) are shown for the return cycle.

II. CONDITIONS FOR IMPLEMENTING THE INVENTION

As explained above, the rubber composition included in the tire according to the invention is based on one or more diene elastomers, on one or more reinforcing fillers, on a chemical crosslinking agent and on at least one modifying agent of formula (I), and optional additives conventionally used in tire rubber compositions.

The expression composition "based on" should be understood as meaning a composition comprising the mixture and/or the reaction product of the various constituents used, some of these base constituents being capable of reacting or intended to react with one another, at least in part, during the various phases of manufacture of the composition, in particular during the chemical crosslinking thereof.

In the present description, unless expressly indicated otherwise, all the percentages (%) are % by weight. Moreover, any interval of values denoted by the expression "between a and b" represents the range of values extending from greater than a to less than b (i.e., limits a and b excluded), whereas any interval of values denoted by the expression "from a to b" means the range of values extending from a up to b (i.e., including the strict limits a and b).

II-1. Diene Elastomer

"Diene" elastomer or rubber should be understood as meaning, in a known way, an elastomer resulting at least in part (i.e., a homopolymer or a copolymer) from diene monomers (monomers carrying two carbon-carbon double bonds which may or may not be conjugated).

These diene elastomers can be classified into two categories: "essentially unsaturated" or "essentially saturated". "Essentially unsaturated" is understood to mean generally a diene elastomer resulting at least in part from conjugated diene monomers having a content of units of diene origin (conjugated dienes) which is greater than 15% (mol %); thus it is that diene elastomers such as butyl rubbers or copolymers of dienes and of α-olefins of EPDM type do not come within the preceding definition and can in particular be described as "essentially saturated" diene elastomers (low or very low content of units of diene origin, always less than 15%). In the category of "essentially unsaturated" diene elastomers, "highly unsaturated" diene elastomer is understood to mean in particular a diene elastomer having a content of units of diene origin (conjugated dienes) which is greater than 50%.

Given these definitions, diene elastomer capable of being used in the invention is understood more particularly to mean:

(a) any homopolymer obtained by polymerization of a conjugated diene monomer having from 4 to 12 carbon atoms;

(b) any copolymer obtained by copolymerization of one or more conjugated dienes with one another or with one or more vinylaromatic compounds having from 8 to 20 carbon atoms;

(c) a ternary copolymer obtained by copolymerization of ethylene and of an α-olefin having from 3 to 6 carbon atoms with a non-conjugated diene monomer having from 6 to 12 carbon atoms, such as, for example, the elastomers obtained from ethylene and propylene with a non-conjugated diene monomer of the abovementioned type, such as, in particular, 1,4-hexadiene, ethylidenenorbornene or dicyclopentadiene; such polymers are described in particular in the documents WO 2004/035639A1 and US 2005/0239639A1;

(d) a copolymer of isobutene and of isoprene (butyl rubber) and also the halogenated versions, in particular chlorinated or brominated versions, of this type of copolymer.

Although it applies to any type of diene elastomer, a person skilled in the art of tires will understand that the present invention is preferably employed with essentially unsaturated diene elastomers, in particular of the type (a) or (b) above.

The following are suitable in particular as conjugated dienes: 1,3-butadiene, 2-methyl-1,3-butadiene, 2,3-di($C_1$-$C_5$ alkyl)-1,3-butadienes, such as, for example, 2,3-dimethyl-1, 3-butadiene, 2,3-diethyl-1,3-butadiene, 2-methyl-3-ethyl-1, 3-butadiene or 2-methyl-3-isopropyl-1,3-butadiene, an aryl-1,3-butadiene, 1,3-pentadiene or 2,4-hexadiene. The following, for example, are suitable as vinyl-aromatic compounds: styrene, ortho-, meta- or para-methylstyrene, the "vinyltoluene" commercial mixture, para-(tert-butyl)styrene, methoxystyrenes, chlorostyrenes, vinylmesitylene, divinylbenzene or vinylnaphthalene.

The copolymers can comprise between 99% and 20% by weight of diene units and between 1% and 80% by weight of vinyl-aromatic units. The elastomers can have any microstructure which depends on the polymerization conditions used, in particular on the presence or absence of a modifying and/or randomizing agent and on the amounts of modifying and/or randomizing agent employed. The elastomers can, for example, be block, random, sequential or microsequential elastomers and can be prepared in dispersion, in emulsion or in solution; they can be coupled and/or star-branched or also functionalized with a coupling and/or star-branching or functionalization agent. For coupling with carbon black, mention may be made, for example, of functional groups comprising a C—Sn bond or of aminated functional groups, such as aminobenzophenone, for example; for coupling with a reinforcing inorganic filler, such as silica, mention may be made, for example, of silanol or polysiloxane functional groups having a silanol end (such as described, for example, in FR 2 740 778, U.S. Pat. No. 6,013,718 or WO 2008/141702), of alkoxysilane groups (such as described, for example, in FR 2 765 882 or U.S. Pat. No. 5,977,238), of aminoalkoxysilane groups (such as described, for example, in WO 2009/133068), of carboxyl groups (such as described, for example, in WO 01/92402, U.S. Pat. No. 6,815,473, WO 2004/096865 or US 2006/0089445) or of polyether groups (such as described, for example, in EP 1 127 909, U.S. Pat. No. 6,503,973, WO 2009/000750 or WO 2009/000752). Mention may also be made, as other examples of functionalized elastomers, of the elastomers (such as SBR, BR, NR or IR) of the epoxidized type, halogenated type, or type comprising carboxylic acid or anhydride functional groups.

The following are suitable: polybutadienes, in particular those having a content (mol %) of 1,2-units of between 4% and 80% or those having a content (mol %) of cis-1,4-units of greater than 80%, polyisoprenes, butadiene/styrene copolymers and in particular those having a Tg (glass transition temperature, measured according to ASTM D3418) of between 0° C. and −70° C. and more particularly between −10° C. and −60° C., a styrene content of between 5% and 60% by weight and more particularly between 20% and 50%, a content (mol %) of 1,2-bonds of the butadiene part of between 4% and 75% and a content (mol %) of trans-1,4-bonds of between 10% and 80%, butadiene/isoprene copolymers, in particular those having an isoprene content of between 5% and 90% by weight and a Tg of −40° C. to −80° C., or isoprene/styrene copolymers, in particular those having a styrene content of between 5% and 50% by weight and a Tg of between 5° C. and −50° C. In the case of butadiene/styrene/isoprene copolymers, those having a styrene content of between 5% and 50% by weight and more particularly of between 10% and 40%, an isoprene content of between 15% and 60% by weight and more particularly between 20% and 50%, a butadiene content of between 5% and 50% by weight and more particularly of between 20% and 40%, a content (mol %) of 1,2-units of the butadiene part of between 4% and 85%, a content (mol %) of trans-1,4-units of the butadiene part of between 6% and 80%, a content (mol %) of 1,2-plus 3,4-units of the isoprene part of between 5% and 70% and a content (mol %) of trans-1,4-units of the isoprene part of between 10% and 50%, and more generally any butadiene/styrene/isoprene copolymer having a Tg of between −5° C. and −70° C., are suitable in particular.

To sum up, the diene elastomer or elastomers used in the invention are preferably chosen from the group of the highly unsaturated diene elastomers consisting of polybutadienes (abbreviated to "BRs"), synthetic polyisoprenes (IRs), natural rubber (NR), butadiene copolymers, isoprene copolymers and the mixtures of these elastomers. Such copolymers are more preferably chosen from the group consisting of butadiene/styrene copolymers (SBRs), isoprene/butadiene copolymers (BIRs), isoprene/styrene copolymers (SIRs) and isoprene/butadiene/styrene copolymers (SBIRs).

According to a specific embodiment, the diene elastomer is predominantly (i.e., for more than 50 phr) an SBR, whether an SBR prepared in emulsion ("ESBR") or an SBR prepared in solution ("SSBR"), or an SBR/BR, SBR/NR (or SBR/IR), BR/NR (or BR/IR) or also SBR/BR/NR (or SBR/BR/IR) blend (mixture). In the case of an SBR (ESBR or SSBR) elastomer, use is made in particular of an SBR having a moderate styrene content, for example of between 20% and 35% by weight, or a high styrene content, for example from 35 to 45%, a content of vinyl bonds of the butadiene part of between 15% and 70%, a content (mol %) of trans-1,4-bonds of between 15% and 75% and a Tg of between −10° C. and −55° C.; such an SBR can advantageously be used as a mixture with a BR preferably having more than 90% (mol %) of cis-1,4-bonds.

According to another specific embodiment, the diene elastomer is predominantly (for more than 50 phr) an isoprene elastomer. This is the case in particular when the compositions of the invention are intended to constitute, in the tires, rubber matrices of certain treads (for example for industrial vehicles), of crown reinforcing plies (for example of working plies, protection plies or hooping plies), of carcass reinforcing plies, of sidewalls, of beads, of protectors, of underlayers, of rubber blocks and other internal rubbers providing the interface between the abovementioned regions of the tires.

"Isoprene elastomer" is understood to mean, in a known way, an isoprene homopolymer or copolymer, in other words a diene elastomer chosen from the group consisting of natural rubber (NR), synthetic polyisoprenes (IRs), the various copolymers of isoprene and the mixtures of these elastomers. Mention will in particular be made, among isoprene copolymers, of isobutene/isoprene copolymers (butyl rubber—IIRs), isoprene/styrene copolymers (SIRs), isoprene/butadiene copolymers (BIRs) or isoprene/butadiene/styrene copolymers (SBIRs). This isoprene elastomer is preferably natural rubber or a synthetic cis-1,4-polyisoprene; use is preferably made, among these synthetic polyisoprenes, of the polyisoprenes having a content (mol %) of cis-1,4-bonds of greater than 90%, more preferably still of greater than 98%.

According to another specific embodiment, in particular when it is intended for a tire sidewall or for an airtight internal rubber of a tubeless tire (or other air-impermeable component), the composition included in the tire in accordance with the invention can comprise at least one essentially saturated diene elastomer, in particular at least one EPDM copolymer or one butyl rubber (optionally chlorinated or brominated), whether these copolymers are used alone or as a mixture with highly unsaturated diene elastomers as mentioned above, in particular NR or IRs, BRs or SBRs.

According to another preferred embodiment of the invention, the rubber composition comprises a blend of a (one or more) "high Tg" diene elastomer exhibiting a Tg of between −70° C. and 0° C. and of a (one or more) "low Tg" diene elastomer exhibiting a Tg of between −110° C. and −80° C., more preferably between −105° C. and −90° C. The high Tg elastomer is preferably chosen from the group consisting of SSBRs, E-SBRs, natural rubber, synthetic polyisoprenes (exhibiting a content (mol %) of cis-1,4-structures preferably of greater than 95%), BIRs, SIRs, SBIRs and the mixtures of these elastomers. The low Tg elastomer preferably comprises butadiene units according to a content (mol %) at least equal to 70%; it preferably consists of a polybutadiene (BR) exhibiting a content (mol %) of cis-1,4-structures of greater than 90%.

According to another specific embodiment of the invention, the rubber composition comprises, for example, from 30 to 100 phr, in particular from 50 to 100 phr, of a high Tg elastomer as a blend with from 0 to 70 phr, in particular from 0 to 50 phr, of a low Tg elastomer; according to another example, it comprises, for the whole of the 100 phr, one or more SBR(s) prepared in solution.

According to another specific embodiment of the invention, the diene elastomer of the composition included in the tire according to the invention comprises a blend of a BR (as low Tg elastomer) exhibiting a content (mol %) of cis-1,4-structures of greater than 90% with one or more S-SBR(s) or E-SBR(s) (as high Tg elastomer(s)).

As explained above, the rubber composition included in the tire according to the invention is based on at least one diene elastomer and at least one modifying agent. The diene elastomer can be grafted by the modifying agent prior to being introduced into the rubber composition, or else can be grafted by reaction with the modifying agent during the manufacture of the composition.

The composition included in the tire according to the invention can thus comprise just one diene elastomer grafted by the modifying agent (either grafted prior to being introduced into the composition or grafted by reaction with the modifying agent during the manufacture of the composition), or a mixture of several diene elastomers which are all grafted, or some of which are grafted and the others not, it being possible for the diene elastomer or elastomers to be used in combination with any type of synthetic elastomer other than a diene elastomer, indeed even with polymers other than elastomers, for example thermoplastic polymers.

II-2. Modifying Agent

As explained above, at least one diene elastomer is grafted along its chain by a modifying agent comprising an associative group, either prior to being introduced into the composition or by reaction with the modifying agent during the manufacture of the composition.

Associative groups is understood to mean groups capable of associating with one another via nonpermanent physical interactions, such as ionic interactions, hydrogen bonds, ion-dipole interactions and dipole-dipole interactions. According to a preferred form of the invention, they are groups capable of associating via hydrogen bonds and comprising a nitrogenous heterocycle, preferably a dinitrogenous heterocycle, generally having 5 or 6 ring members.

Thus, the grafting along the chain of the elastomer of a modifying agent carrying an associative group makes it possible to establish, between the elastomer chains, crosslinking bridges having noncovalent bonds.

The modifying agent is chosen from the compounds of following formula (I):

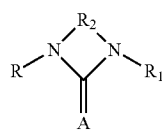

(I)

where

R denotes a unit comprising at least one reactive group, $R_1$ denotes hydrogen, $R_2$ denotes an alkylene radical comprising from 2 to 8 carbon atoms and optionally one or more heteroatoms chosen from S, N, O or Si, A denotes an oxygen or sulphur atom or an =NH group, preferably an oxygen atom.

Preferably, R denotes an —$R_3$X unit, where $R_3$ denotes a $C_2$-$C_{50}$ alkyl radical which can comprise one or more nitrogen, oxygen, sulphur and silicon atoms and X is a reactive group.

Reactive group describes the functional group which makes it possible to establish the grafting with the elastomer. The reactive group or groups of the R unit can be chosen from amine, thiol, epoxy, isocyanate, anhydride, alcohol and carboxylic acid groups, preferably amine and thiol groups.

Thus, the modifying agent can be chosen from 2-aminoethylimidazolidone (UDETA), 11-mercapto-N-(2-(2-oxoimidazolidin-1-yl)ethyl)undecanamide, 1-(2-[(2-aminoethyl)amino]ethyl)imidazolidone (UTETA) and 1-(2-[{2-(2-aminoethylamino)ethyl}-amino]ethyl)imidazolidone (UTEPA).

According to a preferred embodiment, the content of modifying agent varies from 0.05 to 10 mol %, preferably from 0.1 to 2 mol % and better still from 0.2 to 1 mol %.

II-3. Grafting of the Modifying Agent to the Elastomer

The grafting of the elastomer takes place by reaction of the said elastomer with the reactive group or groups carried by the modifying agent. During this reaction, this reactive group or these reactive groups form(s) covalent bonds with the chain of the elastomer.

The grafting of the modifying agent can be carried out neat, for example in an internal mixer or an external mixer, such as an open mill, or in solution.

a) Grafting by the Radical Route

The grafting of the modifying agent is carried out by radical grafting, that is to say by a radical reaction between the reactive group or groups of the modifying agent and one or more double bonds of the chain of the elastomer.

The preparation of the diene elastomer grafted along the chain can be obtained by a radical grafting reaction carried out in solution or neat using a reactant of mercaptans type, which reaction is intended to graft the said reactive groups of the modifying agent to the chain of the starting diene elastomer. The said grafting reaction is optionally carried out in the presence of a radical initiator, such as a peroxide.

The grafting process can be carried out continuously or batchwise. The polymer thus modified can be separated from its solution by any type of means known to a person skilled in the art, and in particular by a steam stripping operation.

b) Grafting to a Premodified Elastomer

The grafting of the modifying agent can also be carried out via functional groups present on the ungrafted elastomer. In this case, the grafting of the modifying agent is carried out by reaction of the reactive group or groups of the modifying agent with functional groups present on the ungrafted elastomer. Such functional groups can be chosen from anhydride, epoxide, halogen and carboxylic acid groups.

When the elastomer carries epoxy functional groups, the modifying agent can carry amine, thiol or alcohol groups.

When the elastomer carries halogen functional groups, the modifying agent can carry amine, thiol or alcohol groups.

When the elastomer carries amine functional groups, the modifying agent can carry epoxy, isocyanate, anhydride or carboxylic acid groups.

When the elastomer carries carboxylic acid functional groups, the modifying agent can carry amine, thiol, epoxy or alcohol groups.

When the elastomer carries anhydride functional groups, the modifying agent can carry amine, thiol or alcohol groups.

In the case where the reactive group of the modifying agent is an amine group and where the elastomer has been premodified by epoxy groups, the grafting reaction is an opening of the epoxide by the amine and this reaction can be carried out in solution or neat. The said grafting reaction is optionally carried out in the presence of a base for the deprotonation of the amine.

The grafting process can be carried out continuously or batchwise. The polymer thus modified can be separated from its solution by any type of means known to a person skilled in the art, in particular by a steam stripping operation.

II-2. Reinforcing Filler

Use may be made of any type of reinforcing filler known for its abilities to reinforce a rubber composition which can be used in the manufacture of tires, for example a reinforcing organic filler, such as carbon black, a reinforcing inorganic filler, such as silica, or also a blend of these two types of filler, in particular a blend of carbon black and silica.

All carbon blacks, in particular blacks of the HAF, ISAF or SAF type, conventionally used in tires ("tire-grade" blacks) are suitable as carbon blacks. Mention will more particularly be made, among the latter, of the reinforcing carbon blacks of the 100, 200 or 300 series (ASTM grades), such as, for example, the N115, N134, N234, N326, N330, N339, N347 or N375 blacks.

Use may also be made, depending on the applications targeted, of blacks of higher series FF, FEF, GPF, SRF, for example the N660, N683 or N772 blacks. The carbon blacks might, for example, be already incorporated in the isoprene elastomer in the form of a masterbatch (see, for example, Applications WO 97/36724 or WO 99/16600).

Mention may be made, as examples of organic fillers other than carbon blacks, of the functionalized polyvinylaromatic organic fillers as described in Applications WO-A-2006/069792 and WO-A-2006/069793.

"Reinforcing inorganic filler" should be understood, in the present patent application, by definition, as meaning any inorganic or mineral filler, whatever its colour and its origin (natural or synthetic), also known as "white filler", "clear filler" or even "non-black filler", in contrast to carbon black, capable of reinforcing by itself alone, without means other than an intermediate coupling agent, a rubber composition intended for the manufacture of tires, in other words capable of replacing, in its reinforcing role, a conventional tire-grade carbon black; such a filler is generally characterized, in a known way, by the presence of hydroxyl (—OH) groups at its surface.

The physical state under which the reinforcing inorganic filler is provided is not important, whether it is in the form of a powder, of microbeads, of granules, of beads or any other appropriate densified form. Of course, reinforcing inorganic filler is also understood to mean mixtures of different reinforcing inorganic fillers, in particular of highly dispersible siliceous and/or aluminous fillers as described below.

Mineral fillers of the siliceous type, in particular silica ($SiO_2$), or of the aluminous type, in particular alumina ($Al_2O_3$), are suitable in particular as reinforcing inorganic fillers. The silica used can be any reinforcing silica known to a person skilled in the art, in particular any precipitated or pyrogenic silica exhibiting a BET surface and a CTAB specific surface both of less than 450 $m^2/g$, preferably from 30 to 400 $m^2/g$. Mention will be made, as highly dispersible precipitated silicas ("HDSs"), for example, of the "Ultrasil 7000" and "Ultrasil 7005" silicas from Degussa, the "Zeosil" 1165 MP, 1135 MP and 1115 MP silicas from Rhodia, the "Hi-Sil EZ150G" silica from PPG, the "Zeopol" 8715, 8745 and 8755 silicas from Huber or the silicas with a high specific surface as described in Application WO 03/16837.

When the composition according to the invention is intended for tire treads having a low rolling resistance, the reinforcing inorganic filler used, in particular if it is silica, preferably has a BET surface of between 45 and 400 $m^2/g$, more preferably of between 60 and 300 $m^2/g$.

According to the invention, the content of reinforcing filler in the composition is between 30 and 150 phr, more preferably between 50 and 120 phr. The optimum is different depending on the specific applications targeted: the level of reinforcement expected with regard to a bicycle tire, for example, is, of course, less than that required with regard to a tire capable of running at high speed in a sustained manner, for example a motorcycle tire, a tire for a passenger vehicle or a tire for a utility vehicle, such as a heavy duty vehicle.

According to one embodiment, the reinforcing filler predominantly comprises silica, the content of carbon black present in the composition preferably being between 2 and 20 phr.

According to another embodiment of the invention, the reinforcing filler predominantly comprises carbon black.

In order to couple the reinforcing inorganic filler to the diene elastomer, use is made, in a known way, of an at least bifunctional coupling agent (or bonding agent) intended to provide a satisfactory connection, of chemical and/or physical nature, between the inorganic filler (surface of its particles) and the diene elastomer, in particular bifunctional organosilanes or polyorganosiloxanes.

Use is made in particular of silane polysulphides, referred to as "symmetrical" or "unsymmetrical" depending on their specific structure, as described, for example, in Applications WO 03/002648 (or US 2005/016651) and WO 03/002649 (or US 2005/016650).

"Symmetrical" silane polysulphides corresponding to the following general formula (III):

x is an integer from 2 to 8 (preferably from 2 to 5);
A is a divalent hydrocarbon radical (preferably, $C_1$-$C_{18}$ alkylene groups or $C_6$-$C_{12}$ arylene groups, more particularly $C_1$-$C_{10}$, in particular $C_1$-$C_4$, alkylenes, especially propylene);
Z corresponds to one of the formulae below:

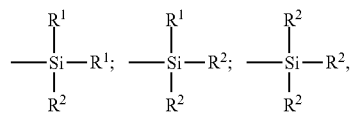

in which:
the $R^1$ radicals, which are unsubstituted or substituted and identical to or different from one another, represent a $C_1$-$C_{18}$ alkyl, $C_5$-$C_{18}$ cycloalkyl or $C_6$-$C_{18}$ aryl group (preferably, $C_1$-$C_6$ alkyl, cyclohexyl or phenyl groups, in particular $C_1$-$C_4$ alkyl groups, more particularly methyl and/or ethyl),
the $R^2$ radicals, which are unsubstituted or substituted and identical to or different from one another, represent a $C_1$-$C_{18}$ alkoxyl or $C_5$-$C_{18}$ cycloalkoxyl group (preferably a group chosen from $C_1$-$C_8$ alkoxyls and $C_5$-$C_8$ cycloalkoxyls, more preferably still a group chosen from $C_1$-$C_4$ alkoxyls, in particular methoxyl and ethoxyl), are suitable in particular, without the above definition being limiting.

In the case of a mixture of alkoxysilane polysulphides corresponding to the above formula (III), in particular the usual mixtures available commercially, the mean value of the "x" index is a fractional number preferably of between 2 and 5, more preferably in the vicinity of 4. However, the invention can also advantageously be carried out, for example, with alkoxysilane disulphides (x=2).

Mention will more particularly be made, as examples of silane polysulphides, of bis(($C_1$-$C_4$)alkoxyl($C_1$-$C_4$)alkylsilyl ($C_1$-$C_4$)alkyl) polysulphides (in particular disulphides, trisulphides or tetrasulphides), such as, for example, bis(3-trimethoxysilylpropyl) or bis(3-triethoxysilylpropyl) polysulphides. Use is in particular made, among these compounds, of bis(3-triethoxysilylpropyl)tetrasulphide, abbreviated to TESPT, of formula [($C_2H_5O)_3Si(CH_2)_3S_2]_2$, or bis(triethoxysilylpropyl)disulphide, abbreviated to TESPD, of formula [($C_2H_5O)_3Si(CH_2)_3S]_2$. Mention will also be made, as preferred examples, of bis(mono($C_1$-$C_4$) alkoxyldi($C_1$-$C_4$)alkylsilylpropyl)polysulphides (in particular disulphides, trisulphides or tetrasulphides), more particularly bis(monoethoxydimethylsilylpropyl)tetrasulphide, as described in Patent Application WO 02/083782 (or US 2004/132880).

Mention will in particular be made, as coupling agent other than alkoxysilane polysulphide, of bifunctional POSs (polyorganosiloxanes) or of hydroxysilane polysulphides ($R^2$=OH in the above formula III), such as described in Patent Applications WO 02/30939 (or U.S. Pat. No. 6,774,255) and WO 02/31041 (or US 2004/051210), or of silanes or POSs carrying azodicarbonyl functional groups, such as described, for example, in Patent Applications WO 2006/125532, WO 2006/125533, WO 2006/125534 and WO 2009/062733.

In the rubber compositions included in the tire according to the invention, the content of coupling agent is preferably between 0.5 and 12 phr, more preferably between 3 and 8 phr.

A person skilled in the art will understand that use might be made, as filler equivalent to reinforcing inorganic filler described in the present section, of a reinforcing filler of another nature, in particular organic nature, provided that this reinforcing filler is covered with an inorganic layer, such as silica, or else comprises, at its surface, functional sites, in particular hydroxyls sites, requiring the use of a coupling agent for establishing the bond between the filler and the elastomer.

II.3 Chemical Crosslinking Agent

The chemical crosslinking makes possible the formation of covalent bonds between the elastomer chains. The chemical crosslinking can be carried out by means of a vulcanisation system or else by means of peroxide compounds.

The vulcanisation system proper is based on sulphur (or on a sulphur-donating agent) and on a primary vulcanisation accelerator. Various known vulcanisation activators or secondary accelerators, such as zinc oxide, stearic acid or equivalent compounds, or guanidine derivatives (in particular diphenylguanidine), come to be added to this base vulcanisation system, being incorporated during the first non-productive phase and/or during the productive phase, as described subsequently.

The sulphur is used at a preferred content of between 0.5 and 12 phr, in particular between 1 and 10 phr. The primary vulcanisation accelerator is used at a preferred content of between 0.5 and 10 phr, more preferably of between 0.5 and 5.0 phr.

Use may be made, as (primary or secondary) accelerator of any compound capable of acting as accelerator of the vulcanisation of diene elastomers in the presence of sulphur, in particular accelerators of the thiazole type and their derivatives or accelerators of thiuram, or zinc dithiocarbamate types. These accelerators are chosen, for example, from the group consisting of 2-mercaptobenzothiazyl disulphide (abbreviated to "MBTS"), tetrabenzylthiuram disulphide ("TBZTD"), N-cyclohexyl-2-benzothiazolesulphenamide ("CBS"), N,N-dicyclohexyl-2-benzothiazolesulphenamide ("DCBS"), N-tertbutyl-2-benzothiazolesulphenamide ("TBBS"), N-tert-butyl-2-benzothiazolesulphenimide ("TBSI"), zinc dibenzyldithiocarbamate ("ZBEC") and the mixtures of these compounds.

Preferably, a primary accelerator of the sulphenamide type is used.

When the chemical crosslinking is carried out using one or more peroxide compounds, the said peroxide compound or compounds represent from 0.01 to 10 phr.

Mention may be made, as peroxide compounds which can be used as chemical crosslinking system, of acyl peroxides, for example benzoyl peroxide or p-chlorobenzoyl peroxide, ketone peroxides, for example methyl ethyl ketone peroxide, peroxyesters, for example t-butylperoxyacetate, t-butylperoxybenzoate and t-butylperoxyphthalate, alkyl peroxides, for example dicumyl peroxide, di(t-butyl) peroxybenzoate and 1,3-bis(t-butylperoxyisopropyl)benzene, or hydroperoxides, for example t-butyl hydroperoxide.

II-4. Various Additives

The rubber composition included in the tire according to the invention can also comprise all or a portion of the usual additives generally used in the elastomer compositions intended for the manufacture of tires, in particular of treads, such as, for example, plasticisers or extending oils, whether the latter are aromatic or nonaromatic in nature, pigments, protection agents, such as antiozone waxes (such as Cire Ozone C32 ST), chemical antiozones, antioxidants (such as 6-PPD), antifatigue agents, reinforcing resins, methylene acceptors (for example phenolic novolak resin) or methylene donors (for example HMT or H3M), as described, for example, in Application WO 02/10269, or adhesion promoters (for example cobalt salts).

Preferably, the composition included in the tire according to the invention comprises, as preferred nonaromatic or very slightly aromatic plasticizing agent, at least one compound chosen from the group consisting of naphthenic oils, paraffinic oils, MES oils, TDAE oils, glycerol esters (in particular trioleates), plasticizing hydrocarbon resins exhibiting a high Tg preferably of greater than 30° C., and the mixtures of such compounds.

The composition included in the tire according to the invention can also comprise, in addition to the coupling agents, activators of the coupling of the reinforcing inorganic filler or more generally processing aids capable, in a known way, by virtue of an improvement in the dispersion of the inorganic filler in the rubber matrix and of a lowering of the viscosity of the compositions, of improving their property of processing in the raw state, these agents being, for example, hydrolysable silanes, such as alkylalkoxysilanes (in particular alkyltriethoxysilanes), polyols, polyethers (for example polyethylene glycols), primary, secondary or tertiary amines (for example trialkanolamines), hydroxylated or hydrolysable POSs, for example α,ω-dihydroxypolyorganosiloxanes (in particular α,ω-dihydroxypolydimethylsiloxanes), or fatty acids, such as, for example, stearic acid.

II-5. Manufacture of the Rubber Compositions

The rubber composition included in the tire according to the invention is manufactured in appropriate mixers using two successive preparation phases according to a general procedure well known to a person skilled in the art: a first phase of thermomechanical working or kneading (sometimes described as "non-productive" phase) at high temperature, up to a maximum temperature of between 130° C. and 200° C., preferably between 145° C. and 185° C., followed by a second phase of mechanical working (sometimes described as "productive" phase) at a lower temperature, typically of less than 120° C., for example between 60° C. and 100° C., finishing phase during which the chemical crosslinking system is incorporated.

According to a preferred embodiment of the invention, all the base constituents of the composition included in the tire of the invention, with the exception of the chemical crosslinking system, mainly the reinforcing filler or fillers or the coupling agent, if appropriate, are intimately incorporated, by kneading, in the diene elastomer or diene elastomers during the first "non-productive" phase, that is to say that at least these various base constituents are introduced into the mixer and that kneading is carried out thermomechanically, in one or more stages, until the maximum temperature of between 130° C. and 200° C., preferably of between 145° C. and 185° C., is reached.

According to a first embodiment of the invention, the diene elastomer has been grafted by the modifying agent prior to the manufacture of the rubber composition. Thus, in this case, it is the grafted diene elastomer which is introduced during the first "non-productive" phase.

According to a second embodiment of the invention, the grafting of the diene elastomer by the modifying agent is carried out concomitantly with the manufacture of the rubber composition. In this case, both the diene elastomer, not yet grafted, and the modifying agent are introduced during the first "non-productive" phase.

By way of example, the first (non-productive) phase is carried out in a single thermomechanical stage during which all the necessary constituents, the optional additional processing aids and various other additives, with the exception of the chemical crosslinking system, are introduced into an appropriate mixer, such as a normal internal mixer. The total duration of kneading, in this non-productive phase, is preferably between 1 and 15 min. After cooling the mixture thus obtained during the first non-productive phase, the chemical crosslinking system is then incorporated at low temperature, generally in an external mixer, such as an open mill; everything is then mixed (productive phase) for a few minutes, for example between 2 and 15 min.

The final composition thus obtained is then calendared, for example in the form of a sheet or of a plaque, in particular for laboratory characterization, or else extruded in the form of a rubber profiled element which can be used, for example, as a tire tread for a passenger vehicle.

III. EXAMPLES OF THE IMPLEMENTATION OF THE INVENTION

III-1. Radical grafting of 11-mercapto-N-(2-(2-oxoimidazolidin-1-yl)ethyl)undecanamide to an SBR elastomer 1) Starting Elastomer Used:

Use is made, as starting elastomer, of the copolymer of styrene and butadiene (SBR) prepared in solution exhibiting the following microstructure characteristics, determined by $^1$H NMR:

content by weight of styrene units: 26.5% content by weight of 1,2-(vinyl) structures in the units resulting from a butadiene: 24.0%.

This SBR exhibits a molar mass Mn=259 700 g/mol (PI=1.1), a Tg of −48° C. (with a ΔT=7° C.) and a Mooney (1+4) viscosity of 53.8.

In the tests which follow, the ungrafted SBR elastomer (control elastomer) is denoted as SBR-A and the grafted elastomer is denoted SBR-B.

2) Implementation of the Radical Grafting:

300 g of antioxidized SBR are dissolved in 2.7 l of cyclohexane in a 10 l jacketed reactor.

At the same time, a solution of lauroyl peroxide (0.717 g, 1.8 mmol) in cyclohexane (100 ml) and a solution of 11-mercapto-N-(2-(2-oxoimidazolidin-1-yl)ethyl)undecanamide (14.2 g, 43.16 mmol) in dichloromethane (720 ml) are prepared. The amount of peroxide introduced is such that the mercaptan/peroxide molar ratio is equal to 24. The peroxide solution and the mercaptan solution are introduced successively into the elastomer solution.

The modifying agent, 11-mercapto-N-(2-(2-oxoimidazolidin-1-yl)ethyl)undecanamide, has the following formula:

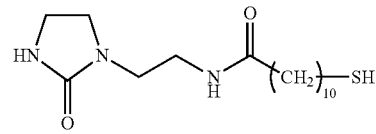

The mixture is subsequently stirred at 80° C. for 4 h and then 31 ml of a 50 g/l solution of 6-PPD (N-(1,3-dimethylbutyl)-N'-phenyl-p-phenylenediamine) in methylcyclohexane are added. The reaction mixture is stirred at 80° C. for 15 minutes. The polymer is separated from its solvent by a stripping operation (steam distillation) in the presence of Tamol® and calcium chloride. The stripped polymer is squeezed free from solvent on rollers and finally dried in an oven at 60° C. under reduced pressure and under a stream of nitrogen.

The degree of grafting then reaches 0.16 mol % (estimated by $^1$H NMR). Furthermore, the NMR analysis confirms the absence of free mercaptan in the polymer. The SBR obtained exhibits a molar mass Mn=290 600 g/mol (PI=1.19).

The grafted elastomer (SBR-B) thus produced exhibits a content of 11-mercapto-N-(2-(2-oxoimidazolidin-1-yl)ethyl)undecanamide of 0.16 mol %.

Measurement of the content of 11-mercapto-N-(2-(2-oxoimidazolidin-1-yl)ethyl)undecanamide The content of grafted 11-mercapto-N-(2-(2-oxoimidazolidin-1-yl)ethyl)undecanamide is determined by an NMR analysis. The spectra are acquired on a Bruker 500 MHz spectrometer equipped with a 5 mm BBIz-grade "broad band" probe. The quantitative $^1$H NMR experiment uses a simple 30° pulse sequence and a repetition time of 3 second between each acquisition. The samples are dissolved in carbon disulphide ($CS_2$). 100 µl of deuterated cyclohexane ($C_6D_{12}$) are added for the lock signal.

The $^1$H NMR spectrum makes it possible to quantify the grafted 11-mercapto-N-(2-(2-oxoimidazolidin-1-yl)ethyl)undecanamide units by integration of the signals characteristic of the $CH_2N$ protons, which appear at a chemical shift of between δ=3-3.5 ppm III-2. Preparation of the Compositions The following procedure is used for the tests which follow: the diene elastomer or elastomers (grafted or ungrafted), the optional reinforcing filler or fillers and the optional coupling agents are introduced into an internal mixer, which is 70% filled and which has an initial vessel temperature of approximately 90° C., followed, after kneading for one to two minutes, with the various other ingredients, with the exception of the vulcanisation system. Thermomechanical working (non-productive phase) is then carried out in one stage (total kneading time equal to approximately 5 min), until a maximum "dropping" temperature of between 110° C. and 190° C., preferably between 130° C. and 180° C., is reached. The mixture thus obtained is recovered and is cooled, and then the vulcanisation system (sulphur) is added on an external mixer (homofinisher) at a temperature of less than 120° C., for example between 60 and 100° C., everything being mixed (productive phase) for approximately from 5 to 6 min.

The compositions thus obtained are subsequently calendared, either in the form of plaques (thickness of 2 to 3 mm) or of thin sheets of rubber, for the measurement of their physical or mechanical properties, or in the form of profiled elements which can be used directly, after cutting to and/or assembling at the desired dimensions, for example as semi-finished products for tires, in particular as treads for tires.

III-3 Characterization Tests—Results

The object of this example is to compare the properties of a rubber composition according to the invention, comprising a grafted SBR-B elastomer (composition 3), with two comparative compositions comprising an ungrafted SBR-A elastomer (compositions 1 and 2).

The rubber compositions are given in Table 1. The amounts are expressed in parts per 100 parts by weight of elastomer (phr).

TABLE 1

|  | 1 | 2 | 3 |
|---|---|---|---|
| SBR-A (1) | 100 | 100 |  |
| SBR-B (2) |  |  | 100 |
| Carbon black (3) | 54 | 54 | 54 |
| Sulphur | 1 | 1.5 | 0.85 |
| CBS (4) | 1.6 | 2.3 | 1.36 |

(1) SBR-A: SBR copolymer as defined in section III-1.1)
(2) SBR-B: copolymer grafted from SBR-A in accordance with section III-1.2)
(3) Carbon black N234
(4) CBS: N-cyclohexyl-2-benzothiazolesulphenamide ("Santocure CBS" from Flexsys)

As shown in the above table, the control compositions 1 and 2 differ from one another in different sulphur contents (the CBS content, which is also different, being adjusted with regard to the sulphur content).

Composition 3 in accordance with the invention exhibits a sulphur content (and also the CBS content adjusted to this sulphur content) which is lower than that of compositions 1 and 2.

Results

The properties after curing, measured at 23° C. and 100° C., are given in Table 2.

TABLE 2

| Composition No. | 1 | 2 | 3 |
|---|---|---|---|
| Properties measured at 23° C. |  |  |  |
| MSA10 (MPa) | 6.6 | 7.2 | 7.3 |
| MSA100 (MPa) | 2.3 | 3.2 | 2.6 |
| MSA300 (MPa) | 3.6 | 5.6 | 4.2 |
| MSA300/MSA100 | 1.5 | 1.8 | 1.6 |
| Elongation at break (%) | 572 | 409 | 573 |
| Breaking stress (MPa) | 23.09 | 24.48 | 27.1 |
| Properties measured at 100° C. |  |  |  |
| MSA10 (MPa) | 4.0 | 4.9 | 4.6 |
| MSA100 (MPa) | 1.9 | 2.8 | 2.0 |
| MSA300 (MPa) | 2.7 | Not measurable | 3.0 |
| MSA300/MSA100 | 1.5 | — | 1.5 |
| Elongation at break (%) | 409 | 269 | 431 |
| Breaking stress (MPa) | 12.2 | 11.7 | 14.9 |
| ΔE* (100° C., 0.01% to 7%) | 6.2 | 6.9 | 3.3 |
| tan(δ)$_{max}$ (100° C.) | 0.224 | 0.185 | 0.138 |

Between compositions 1 and 2, there is observed, as expected, an increase in the MSA moduli for the composition 2, which comprises a higher sulphur content, bringing about greater crosslinking at 23° C. and at 100° C. There is also observed, at 23° C. and at 100° C., a poorer elongation at break (lower value of the elongation at break) for the composition 2 than for the composition 1; results also expected by a person skilled in the art in the light of the contents of crosslinking agents of these 2 compositions.

The hysteresis properties (reflected by the measurement at 100° C. of tan(δ)$_{max}$) are improved in the composition 2 with respect to the composition 1. This is known to a person skilled in the art and is explained by an increase in the sulphur content in the composition 2, bringing about a greater crosslinking density.

Furthermore, it is observed, surprisingly, that the composition 3 in accordance with the invention, including a grafted polymer and also a lower content of crosslinking agent than the compositions 1 and 2, exhibits MSA moduli at 23° C. which are between those of the compositions 1 and 2 but with a very marked improvement in the elongation and breaking stress properties with respect to the two control compositions 1 and 2, whereas, when the MSA moduli increase (composition 3 with respect to the composition 1), a person skilled in the art expects to see a deterioration in the elongation and the breaking stress, as may be observed for the composition 2 with respect to the composition 1.

The same phenomenon is observed at 100° C., which is further accompanied, very surprisingly, by a very strong fall in the hysteresis (much smaller tan δ$_{max}$ value) and by a significant decrease in the Payne effect (much lower ΔE*) with respect to the two control compositions 1 and 2.

It is thus found that the rubber compositions in accordance with the invention, which undergo both chemical crosslinking and physical crosslinking, make it possible, despite a lower content of crosslinking agent, to obtain high MSA moduli while significantly enhancing the elongation at break and breaking stress properties and while also very greatly lowering the hysteresis of the composition.

The invention claimed is:

1. A tire comprising at least one rubber composition based on at least one diene elastomer, one reinforcing filler, one chemical crosslinking agent and one modifying agent, which may be pregrafted to the diene elastomer, selected from the the group of compounds of formula (I):

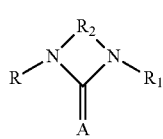

(I)

wherein
R denotes a unit comprising at least one reactive group,
R$_1$ denotes hydrogen,
R$_2$ denotes an alkylene radical comprising from 2 to 8 carbon atoms and which may be substituted or interrupted one or more heteroatoms selected from the group consisting of S, N, O, and Si,
A denotes an oxygen or sulphur atom or an =NH group.

2. The tire according to claim 1, wherein R denotes an —R$_3$X unit, where R$_3$ denotes a C$_2$-C$_{50}$ alkylene radical which can be substituted or interrupted by one or more nitrogen, oxygen, sulphur and silicon atoms and X is a reactive group.

3. The tire according to claim 1, wherein the diene elastomer is selected from natural rubber, synthetic polyisoprenes, polybutadienes, butadiene copolymers, isoprene copolymers, and the mixtures of these elastomers.

4. The tire according to claim 1, wherein the reinforcing filler is composed of an organic reinforcing filler, an inorganic reinforcing filler, or a blend of organic reinforcing filler and inorganic reinforcing filler, and wherein the content of reinforcing filler in the composition is between 30 and 150 phr.

5. The tire according to claim 4, wherein the reinforcing filler predominantly comprises silica.

6. The tire according to claim 4, wherein the reinforcing filler predominantly comprises carbon black.

7. The tire according to claim 4, wherein the reinforcing filler comprises a blend of silica and carbon black.

8. The tire according to claim 1, wherein the chemical crosslinking agent is composed of from 0.5 to 12 phr of sulphur, or of from 0.01 to 10 phr of one or more peroxide compounds.

9. The tire according to claim 1, wherein the content of modifying agent varies from 0.05 to 10 mol %.

10. The tire according to claim 9, wherein the content of modifying agent varies from 0.1 to 2 mol %.

11. The tire according to claim 1, wherein the reactive group or groups of the R unit are selected from the group consisting of amine, thiol, epoxy, isocyanate, anhydride, alcohol, and carboxylic acid groups.

12. The tire according to claim 11, wherein the modifying agent is selected from the group consisting of 2-aminoethylimidazolidone (UDETA), 11-mercapto-N-(2-(2-oxoimidazolidin-1-yl)ethyl)undecanamide, 1-(2-[(2-aminoethyl)amino]ethyl)imidazolidone (UTETA), and 1-(2-{2-[(2-aminoethylamino]ethyl}amino)ethyl]imidazolidone (UTEPA).

13. The tire according to claim 1, wherein the rubber composition further comprises one or more diene elastomers grafted or ungrafted by a modifying agent of formula (I).

14. A process for preparing a tire rubber composition based on at least one diene elastomer, one reinforcing filler and one chemical crosslinking agent, comprising:
grafting, to the diene elastomer, a modifying agent selected from the group consisting of compounds of formula (I):

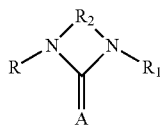

(I)

where
R denotes a unit comprising a reactive group,
$R_1$ denotes hydrogen,
$R_2$ denotes an alkylene radical comprising from 2 to 8 carbon atoms and which may be substituted or interrupted by one or more heteroatoms selected from the group consisting of S, N, O, and Si,
A denotes an oxygen or sulphur atom or an =NH group,
incorporating, in the diene elastomer thus grafted by the modifying agent, the reinforcing filler, everything being thermomechanically kneaded, in one or more goes, until a maximum temperature of between 130° C. and 200° C. is reached,
cooling the combined mixture to a temperature of less than 100° C.,
subsequently incorporating the chemical crosslinking agent,
kneading everything up to a maximum temperature of less than 120° C.,
extruding or calendaring the rubber composition thus obtained.

15. The process according to claim 14, wherein R denotes an —$R_3$X unit, where $R_3$ denotes a $C_2$-$C_{50}$ alkylene radical which can comprise one or more nitrogen, oxygen, sulphur and silicon atoms and X is a reactive group.

16. The process for preparing a tire rubber composition based on at least one diene elastomer, one reinforcing filler and one chemical crosslinking agent, comprising:
incorporating, in the diene elastomer, the reinforcing filler and a modifying agent selected from the group consisting of compounds of formula (I):

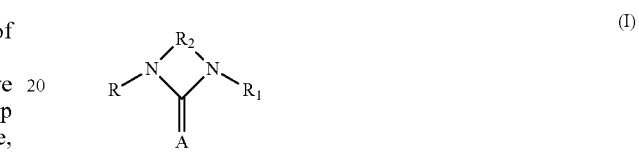

where
R denotes a unit comprising at least one reactive group,
$R_1$ denotes hydrogen,
$R_2$ denotes an alkylene radical comprising from 2 to 8 carbon atoms and may contain one or more heteroatoms selected from the group consisting of S, N, O, and Si,
A denotes an oxygen or sulphur atom or an =NH group
everything being kneaded thermomechanically, in one or more goes, until a maximum temperature of between 130° C. and 200° C. is reached,
cooling the combined mixture to a temperature of less than 100° C.,
subsequently incorporating the chemical crosslinking agent,
kneading everything up to a maximum temperature of less than 120° C.,
extruding or calendaring the rubber composition thus obtained.

17. The process according to claim 16, wherein R denotes an —$R_3$X unit, where $R_3$ denotes a $C_2$-$C_{50}$ alkylene radical which can be substituted or interrupted by one or more nitrogen, oxygen, sulphur, or silicon atoms and X is a reactive group.

18. The tire according to claim 1, wherein A is an oxygen atom.

19. The tire according to claim 4, wherein the content of reinforcing filler is between 50 and 120 phr.

20. The tire according to claim 8, wherein the chemical crosslinking agent is composed of from 1 to 10 phr of sulfur.

21. The tire according to claim 10, wherein the content of modifying agent varies from 0.2 to 1 mol %.

22. The process according to claim 14, wherein A denotes an oxygen atom.

23. The process according to claim 16, wherein A denotes an oxygen atom.

24. The tire according to claim 11, wherein the reactive group or groups of the R unit are selected from the group consisting of amine and thiol groups.

* * * * *